US010395127B2

(12) United States Patent
Uejima

(10) Patent No.: US 10,395,127 B2
(45) Date of Patent: Aug. 27, 2019

(54) STATE PREDICTION DEVICE AND STATE PREDICTION METHOD

(71) Applicant: Hitachi Information & Telecommunication Engineering, Ltd., Yokohama-shi, Kanagawa (JP)

(72) Inventor: Toshiaki Uejima, Yokohama (JP)

(73) Assignee: Hitachi Information & Telecommunication Engineering, Ltd., Yokohama-shi (JP)

( * ) Notice: Subject to any disclaimer, the term of this patent is extended or adjusted under 35 U.S.C. 154(b) by 0 days.

(21) Appl. No.: 15/757,248

(22) PCT Filed: Sep. 13, 2016

(86) PCT No.: PCT/JP2016/076934
§ 371 (c)(1),
(2) Date: Jan. 23, 2019

(87) PCT Pub. No.: WO2018/051399
PCT Pub. Date: Mar. 22, 2018

(65) Prior Publication Data
US 2019/0138827 A1    May 9, 2019

(51) Int. Cl.
*G06K 9/00* (2006.01)
*G06T 7/20* (2017.01)
(Continued)

(52) U.S. Cl.
CPC ............ *G06K 9/00825* (2013.01); *B60R 1/00* (2013.01); *G06T 7/20* (2013.01); *G06T 7/246* (2017.01);
(Continued)

(58) Field of Classification Search
USPC .................................................. 382/103, 104
See application file for complete search history.

(56) References Cited

U.S. PATENT DOCUMENTS 7,742,623 B1 * 6/2010 Moon ................ G06K 9/00604
382/103
7,804,980 B2 * 9/2010 Sasaki ................ G06K 9/00791
340/435
(Continued)

FOREIGN PATENT DOCUMENTS

CN     104915628 A    9/2015
JP      6-133624 A    5/1994
(Continued)

OTHER PUBLICATIONS

International Search Report (PCT/ISA/220 & PCT/ISA/210) issued in PCT Application No. PCT/JP2016/076934 dated Nov. 1, 2016 (five pages).
(Continued)

*Primary Examiner* — Ishrat I Sherali
(74) *Attorney, Agent, or Firm* — Crowell & Moring LLP

(57) ABSTRACT

To provide a technology for accurately estimating the state change of an observation object, there are included a step for acquiring first sensor information that is obtained by observation of a state of an observation object at a first time by a periphery monitoring sensor (S100), steps for identifying the kind of the observation object based on the first sensor information and reading a purpose attribute of the observation object and an environmental factor from a purpose attribute storage unit that stores a purpose attribute that shows a use purpose or an observation purpose of the observation object and an environmental factor that affects the state change of the observation object (S104, S105), a step for retrieving a plurality of finite state series corresponding to the kind of the observation object from a finite state series storage unit that stores a finite state series that corresponds to the kind of the observation object and specifies a series of a plurality of state changes accompanying the time course and reducing the selection number of (Continued)

the plural finite state series to be retrieved, based on the purpose attribute of the observation object and the environmental factor (S108), a step for correcting the finite state series using the observation value of the observation object in the reduced finite state series (S119), and a step for outputting the corrected finite state series as a state prediction (S111).

6 Claims, 11 Drawing Sheets

(51) Int. Cl.
*G06T 7/246* (2017.01)
*G06T 7/73* (2017.01)
*B60R 1/00* (2006.01)

(52) U.S. Cl.
CPC .......... *G06T 7/73* (2017.01); *B60R 2300/802* (2013.01); *G06T 2207/30252* (2013.01); *G06T 2207/30261* (2013.01)

(56) References Cited

U.S. PATENT DOCUMENTS

| | | | | |
|---|---|---|---|---|
| 8,229,663 | B2* | 7/2012 | Zeng | B60W 40/02 |
| | | | | 180/168 |
| 9,064,418 | B2* | 6/2015 | Takemura | G06K 9/00798 |
| 9,248,834 | B1* | 2/2016 | Ferguson | B60W 30/09 |
| 9,964,952 | B1 | 5/2018 | Costa | G05D 1/0289 |
| 10,156,850 | B1* | 12/2018 | Ansari | G05D 1/0214 |
| 10,194,059 | B2* | 1/2019 | Uejima | G06T 7/215 |
| 2007/0047809 | A1 | 3/2007 | Sasaki | |
| 2013/0054106 | A1 | 2/2013 | Schmuedderich et al. | |
| 2018/0032079 | A1* | 2/2018 | Nishi | B60W 50/00 |
| 2019/0102840 | A1* | 4/2019 | Perl | G06N 3/08 |

FOREIGN PATENT DOCUMENTS

| | | |
|---|---|---|
| JP | 2005-44224 A | 2/2005 |
| JP | 2005-44352 A | 2/2005 |
| JP | 2007-72987 A | 3/2007 |
| JP | 2007-299312 A | 11/2007 |
| JP | 2011-44046 A | 3/2011 |
| JP | 2014-63273 A | 4/2014 |

OTHER PUBLICATIONS

Japanese-language Written Opinion (PCT/ISA/237)) issued in PCT Application No. PCT/JP2016/076934 dated Nov. 1, 2016 (three pages).

Extended European Search Report issued in counterpart European Application No. 16911784.3 dated Apr. 8, 2019 (10 pages).

Ballan et al., "Knowledge Transfer for Scene-specific Motion Prediction", Mar. 22, 2016, pp. 1-17, XP080691385, 17 pages.

Karasev et al, "Intent-Aware Long-Term Prediction of Pedestrian Motion", 2016 IEEE International Conference on Robotics and Automation (ICRA), May 16, 2016, pp. 2543-2549, XP032908432, seven pages.

Park et al., "A simulation based method for vehicle motion prediction", Computer Vision and Image Understanding, Academic Press, Mar. 24, 2015, pp. 79-91, vol. 136, Elsevier Inc., XP029240728, 13 pages.

* cited by examiner

ROAD/LANE MODEL EXAMPLE

EXAMPLE OF ATTRIBUTE
AND PARAMETER :

TOPOLOGY NAME:   T-SHAPE INTERSECTION    CONNECTION ANGLE [rad]: A, B, d  $\pi/2$
PURPOSE:         A → B  LEFT TURN        CURVATURE [rad]: a-d  0 , b-d  0
TARGET:          a → d → b               LANE NUMBER: a-d  1 , b-d  1
NODE NAME :      a, b, d                 LENGTH [m]:  a-d  20 , b-d  20
                                         WIDTH [m]:   a-d  5 , b-d  5
                                         GRADIENT [rad]: a-d  0 , b-d  0

Fig. 6(a)
Fig. 6(b)
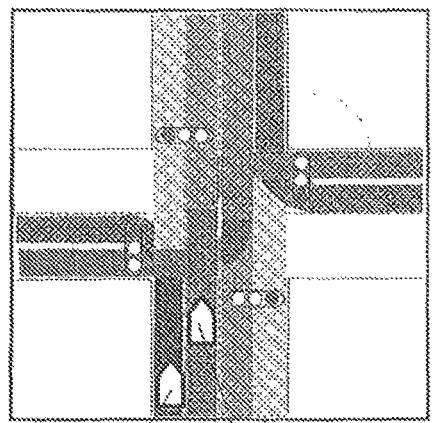
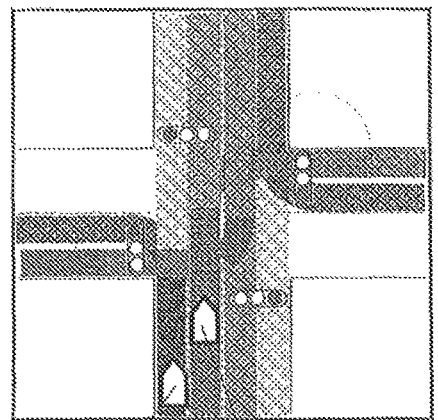
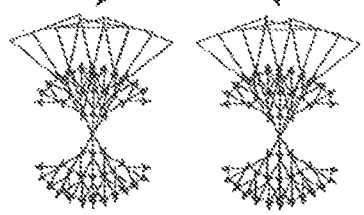
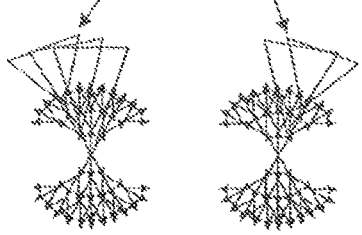

MOVEMENT PREDICTION BY
MOVEMENT SERIES AND
MOVEMENT VECTOR

STATE PREDICTION DEVICE AND STATE PREDICTION METHOD

TECHNICAL FIELD

The present invention relates to a state prediction device and a state prediction method, and relates specifically to a technology for predicting a state change of an observation object based on an output from a periphery monitoring sensor that acquires a state of the observation object.

BACKGROUND ART

In Patent Literature 1, there is proposed a technology in which, from a photographed image, a physical quantity of an object is estimated by a particle filter method, or a position of an object is estimated by a condensation method while using a quantity related to a feature quantity of the object being used as a weight.

In Patent Literature 2, there is proposed a technology in which a three-dimensional model is projected to a two-dimensional observation space, the three-dimensional model being configured with a plurality of feature points and partial image information, the feature points having three-dimensional coordinate values, the partial image information expressing a partial image associated with each feature point, a state quantity of the three-dimensional model is estimated using a feature point set selected in the two-dimensional observation space, the estimated three-dimensional model state is projected to an observation space, the adaptability is calculated repeatedly, and the state quantity of the three-dimensional model is estimated.

In Patent Literature 3, there is proposed a technology in which watching regions for determining presence/absence of a target are set one by one at a plurality of positions in an image, a reference position of parts of a case where the target is assumed to exist at the watching region is set based on a deformable part model, a deformation cost is calculated for each of the parts detected, the deformation cost being a value that expresses the degree of the deviation from the reference position, and the watching region is determined to be a target region where the target configuring a group exists with a condition that the parts of a same kind whose deformation cost calculated is within a predetermined range exist by a plurality.

CITATION LIST

Patent Literature

PATENT LITERATURE 1: JP-A No. 2005-044352
PATENT LITERATURE 2: JP-A No. 2007-299312
PATENT LITERATURE 3: JP-A No. 2014-063273

SUMMARY OF INVENTION

Technical Problem

However, a tracking method to which the particle filter of Patent Literature 1 was applied had such problem of mixing up the particle and erroneous tracking of each object when there were a plurality of similar objects and there was a crossing. Also, there was a problem that the particle disappeared and tracking of the object was mistaken when there was a shield of the object. Further, there was such problem that, in order to achieve stable tracking even when the change of movement of the object was not uniform, it was necessary to form a number of samples and the processing speed dropped. Furthermore, there was such problem that, when the objects increased, the samples to be formed increased and the processing speed dropped.

Although the state quantity of the three-dimensional model was estimated by an effective set of the feature point selected in the two-dimensional observation space of Patent Literature 2, with respect to a prediction of the state of the three-dimensional model of this time from the state of the three-dimensional model of the last time, only the position prediction by calculation of the position, speed, and acceleration was executed, therefore, in order to track a complicated movement where the acceleration changed, it was necessary to shorten an observation interval, and there was a problem that there was no time interval allowing other processes between the observation.

Although an image processing device by the deformable part model of Patent Literature 3 showed a method for precisely detecting the region of the object group, there was a problem that the tracking efficiency of the case where a plurality of similar objects were going to be separated was not excellent.

The object of the present invention is to provide a technology that solves the problems described above and precisely estimates the state change of the observation object based on the observation value of the physical quantity related to the object in the actual environment.

Solution to Problem

In order to achieve the object described above, the present invention is featured to include: a sensor information acquisition unit that acquires first sensor information that is obtained with observation of a state of an observation object at a first time by a periphery monitoring sensor; a purpose attribute storage unit that stores a purpose attribute that shows a use purpose or an observation purpose of the observation object and a purpose attribute that shows a use purpose or an observation purpose of an environmental factor that affects the state change of the observation object; an object identification unit that identifies the kind of the observation object based on the first sensor information, reads a purpose attribute corresponding to an identified kind of the observation object from the purpose attribute storage unit, identifies the kind of the environmental factor based on the first sensor information, and reads a purpose attribute corresponding to an identified kind of the environmental factor from the purpose attribute storage unit; a finite state series storage unit that stores a finite state series that corresponds to the kind of the observation object and specifies a series of a plurality of state changes accompanying the time course; and a state prediction unit that retrieves and selects plural finite state series corresponding to the kind of the observation object from the finite state series storage unit, reduces the selection number of the plural finite state series to be retrieved, based on the purpose attribute of the observation object and the purpose attribute of the environmental factor, acquires an observation value obtained by observation of the observation object, corrects the reduced finite state series based on the observation value, and outputs the reduced finite state series as a state prediction.

Advantageous Effects of Invention

By the invention described above, such technology can be provided which precisely estimates the state change of the observation object based on the observation value of the physical quantity related to the object in the actual environment. Also, the problems and the solutions to the problems other than those described above will be clarified by embodiments described below.

BRIEF DESCRIPTION OF DRAWINGS

FIG. 6 is a drawing that shows a finite state series example, in which (a) is a drawing that shows a selection example of a movement series when road/lane are made not have a purpose attribute, and (b) is a drawing that shows a state example in which the road/lane are made have a purpose attribute and the movement series are reduced.

DESCRIPTION OF EMBODIMENTS

Figure 1:
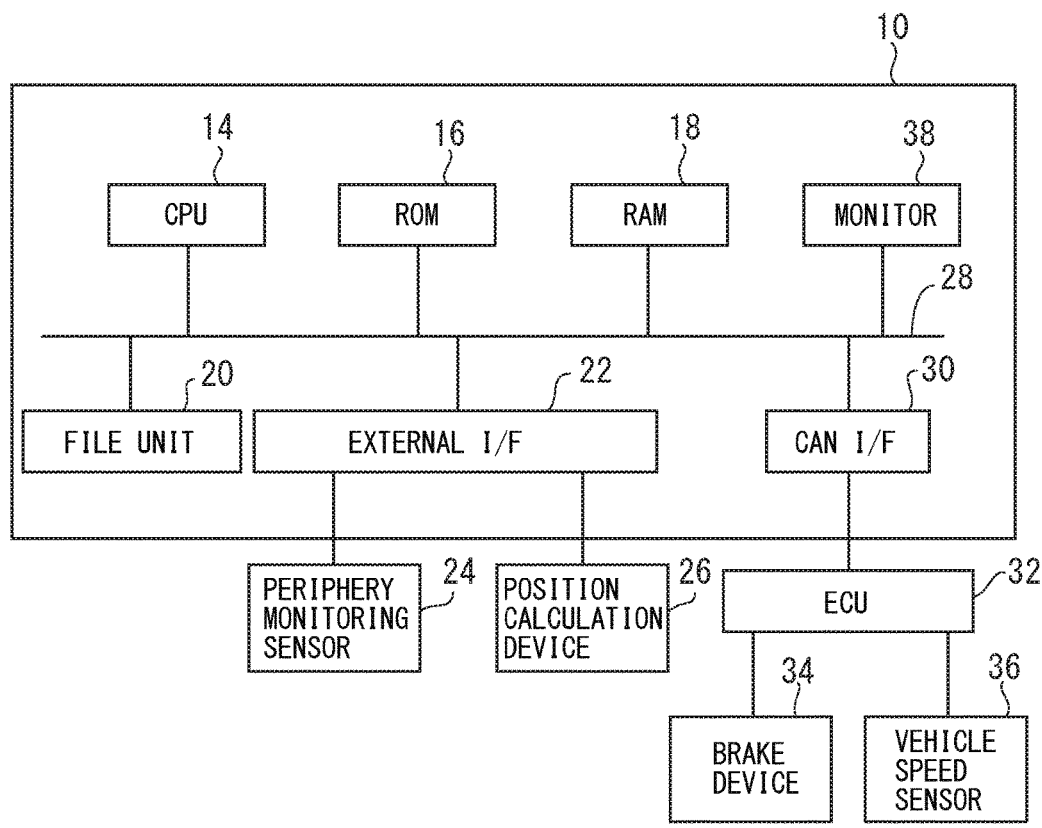
FIG. 1 is a hardware configuration diagram of a state prediction device according to a first embodiment.

Hereinafter, preferable embodiments of the present invention will be explained in detail referring to the drawings.

First Embodiment

The first embodiment is an example in which a state prediction device is mounted on a vehicle, and movements of an observation object (will be hereinafter abbreviated as "object") for example a forward vehicle, a vehicle traveling on an adjacent lane, an oncoming vehicle, a pedestrian, and a bicycle are predicted.

In FIG. 1, a hardware configuration of a state prediction device according to the first embodiment is shown. As shown in FIG. 1, a state prediction device 10 according to the present embodiment is configured as a computer in which each of a CPU 14 that controls a calculation process for predicting the state change of an object, a ROM 16, a RAM 18, and a file unit 20 as a data storage device, and an external interface (I/F) 22 are mutually connected through a bus 28, and are connected so as to be capable of transferring and receiving commands and data. To the external I/F 22, a periphery monitoring sensor 24 and a position calculation device 26 are connected, the periphery monitoring sensor 24 being for acquiring the state information of an object that is a monitoring object of the state prediction device 10, the position calculation device 26 calculating the present position of the vehicle.

In the present embodiment, a camera mounted within a vehicle is used as the periphery monitoring sensor 24, and is hereinafter described as the camera 24 because it photographs other vehicles, pedestrians and the like which are objects outside an own vehicle. Although the periphery is monitored based on images photographed by the camera, the kind of the periphery monitoring sensor 24 is not concerned as far as it is a sensor that can detect an object, and the periphery monitoring sensor 24 may be a millimeter-wave radar and a LIDAR.

Also, the position calculation device 26 may be a GPS (Global Positioning System), an inertial measurement device, a position calculation device that executes road/vehicle communication between a positional information output device that is disposed on a travel route and calculates the position of a vehicle, and the kind of it is not concerned.

Further, in the file unit 20, a model information dictionary 201 (refer to FIG. 2), a state series dictionary 202 (refer to FIG. 2), a purpose attribute dictionary 211, and a target parameter dictionary 212 (refer to FIG. 2) are stored previously, the model information dictionary 201 specifying a model according to the kind of an object on which a state prediction is executed, the state series dictionary 202 specifying plural state change series accompanying the time course of the model, a target attribute that shows the use purpose or the observation purpose of the environmental factor affecting the observation object and the state change of the observation object being stored in the purpose attribute dictionary 211, target parameters set for achieving respective purpose attributes being stored in the target parameter dictionary 212. The model information dictionary 201 is used mainly in the second embodiment. The state series dictionary 202 is equivalent to a finite state series storage unit. The configuration of the purpose attribute dictionary 211 (equivalent to a purpose attribute storage unit) and the target parameter dictionary 212 (equivalent to a target parameter information storage unit) will be described later.

In the ROM 16, programs such as a process routine are stored previously. Also, in the state prediction device 10 according to the present embodiment, a number of electric series constituents such as an electric supply device are included in addition to the configurations described above, however, since they are known or general, detailed explanation thereof will be omitted.

To the bus 28, an on-vehicle network (CAN) I/F 30 is connected. To the CAN I/F 30, an electronic control unit (ECU) 32 is connected. The ECU 32 is connected to a brake device 34 and a vehicle speed sensor 36. The state prediction device 10 acquires the vehicle speed information of the own vehicle through the ECU 32. The vehicle speed information may be only the speed, or may include the acceleration. Also, when the state prediction device 10 has a function of determining the collision risk, control information for activating the brake device 34 may be outputted through the ECU 32 based on the determination result.

Further, it is also possible that a monitor 38 is connected to the bus 28 and an alarm is displayed when the state prediction device 10 has a function of determining the collision risk. Furthermore, with respect to alarming, it may be configured that an alarm device not illustrated is connected to the bus 28 to generate an alarm sound.

Figure 2:
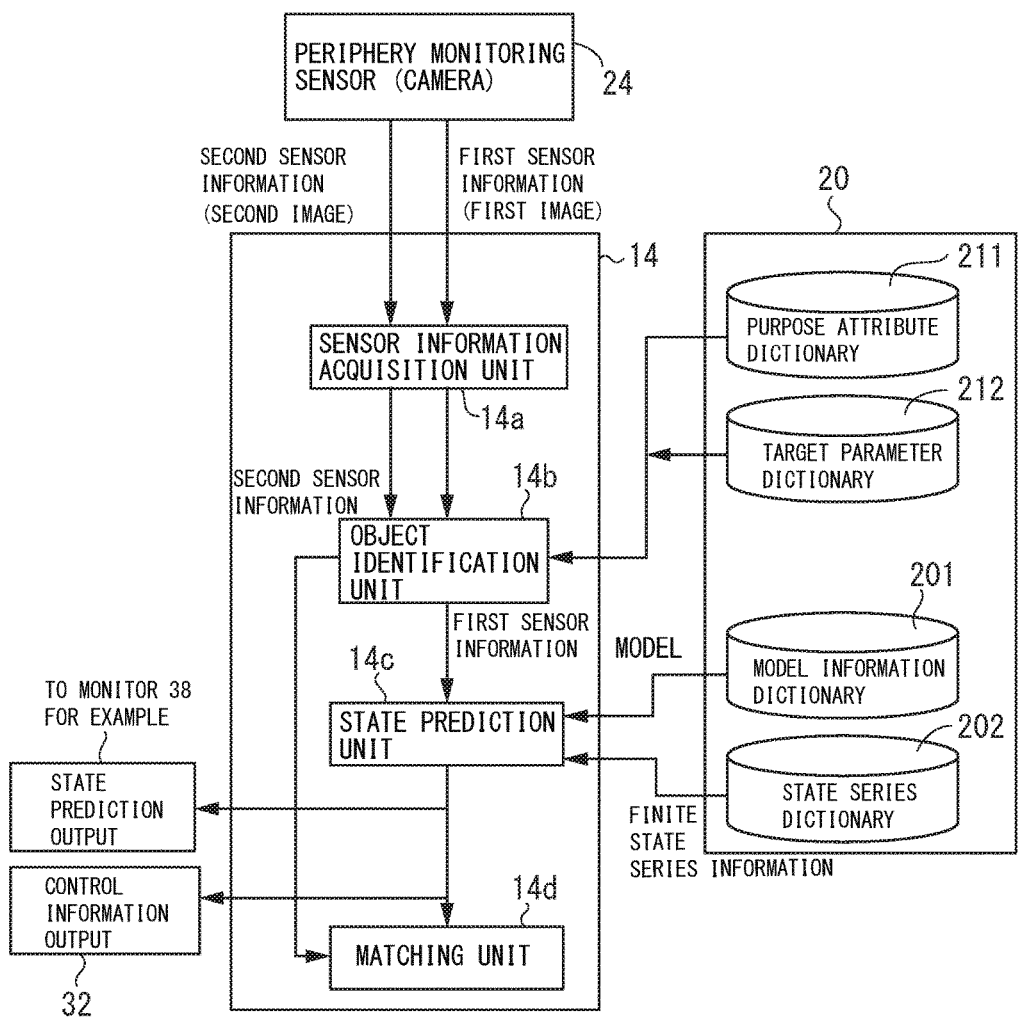
FIG. 2 is a functional block diagram that shows a configuration of a state change prediction program executed in a state prediction device.

FIG. 2 is a functional block diagram that shows a configuration of a state change prediction program executed in the state prediction device 10.

The state prediction device 10 includes a sensor information acquisition unit 14a, an object identification unit 14b, a state prediction unit 14c, and a matching unit 14d. The respective constituents described above are configured by that the CPU 14 loads the programs achieving the functions to the RAM 18 to execute the programs. Also, the file unit 20 includes the model information dictionary 201, the state series dictionary 202, the purpose attribute dictionary 211, and the target parameter dictionary 212. The functions of these respective constituents will be explained through explanation of the process motion of the state prediction device 10 referring to FIG. 3.

As described above, the model information dictionary 201 and the state series dictionary 202 are configured as the data stored in the file unit 20.

Figure 3:
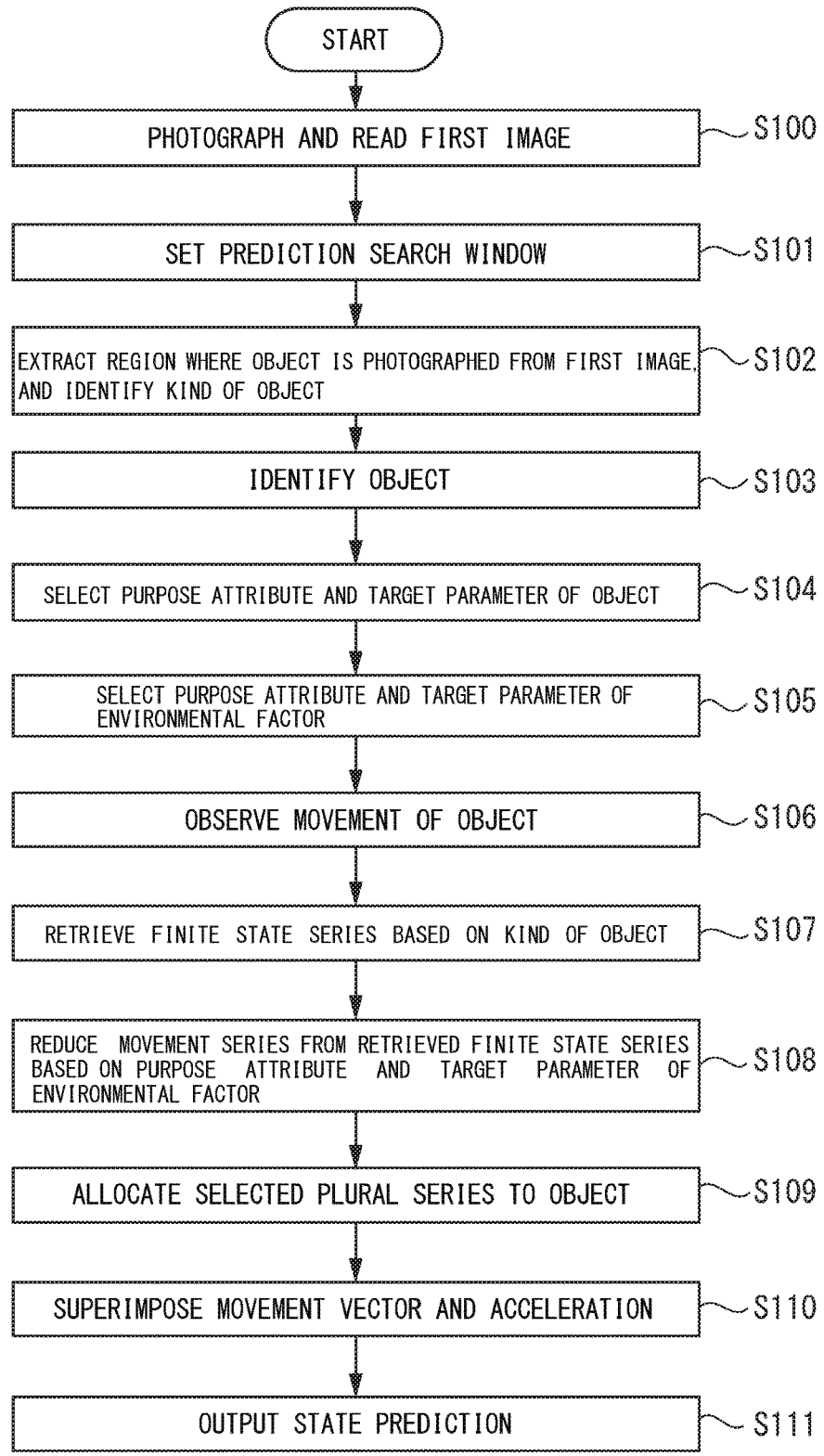
FIG. 3 is a flowchart that shows a flow of a process of predicting movement of a vehicle using a state prediction device according to the present embodiment.

Next, the object movement prediction process executed in the state prediction device 10 of the present embodiment will be explained. FIG. 3 is a flowchart that shows a flow of a process of predicting movement of a vehicle using the state prediction device according to the present embodiment. Also, since movement of a vehicle is predicted in the first embodiment, the movement prediction is outputted in the present process, however, the state prediction of a stationary object is outputted in the second embodiment. In other words, the movement prediction is a concept included in the state prediction, and by translating the movement prediction into the state prediction in the flowchart described below, the state prediction of an object considering the environmental factor can be executed also in the second embodiment similarly to the first embodiment.

The sensor information acquisition unit 14a reads a first image (equivalent to the first sensor information) photographed at the first time by the camera 24 as a periphery monitoring sensor (S100), and outputs the first image to the object identification unit 14b.

Figure 4A:
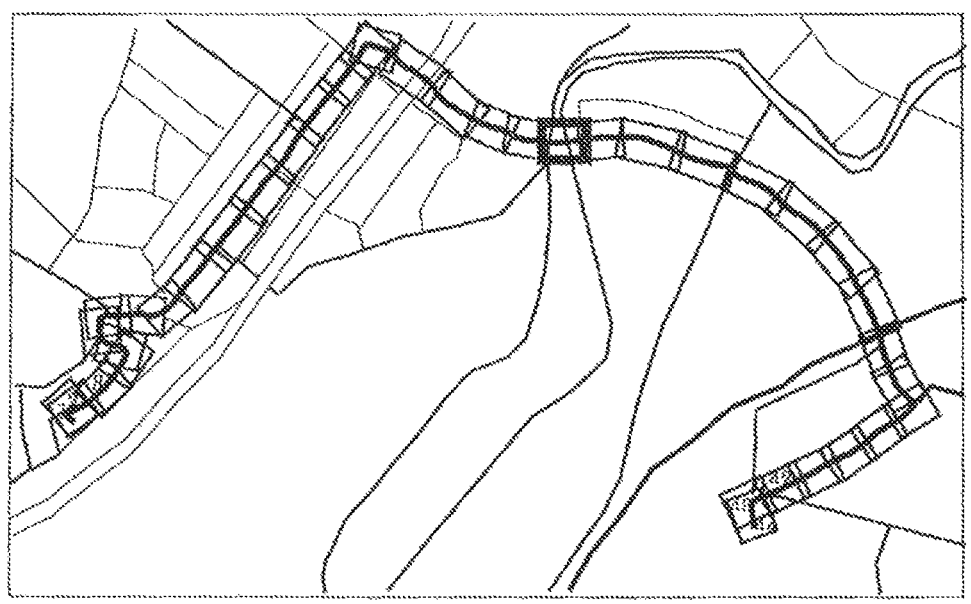
FIG. 4 is a drawing that shows a setting example of a prediction search window when a movement prediction process according to the present embodiment is applied to a car navigation system, in which (a) shows a state in which prediction search windows are set without a gap along a search route, and (b) shows a prediction search window example including an intersection.
Figure 4B:
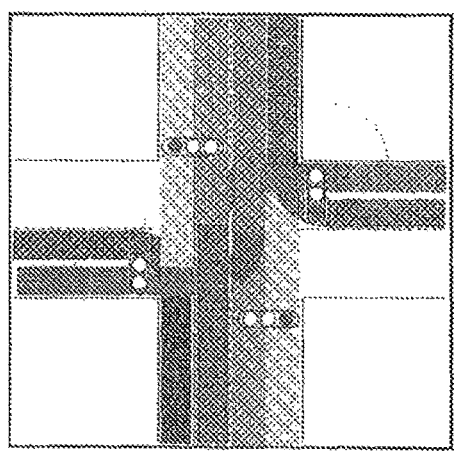

The object identification unit 14b sets a region (called a prediction search window) for executing the object movement prediction process within an actual space (S101). FIG. 4 is a drawing that shows a setting example of a prediction search window when a movement prediction process according to the present embodiment is applied to a car navigation system, in which (a) shows a state in which prediction search windows are set without a gap along a search route, and (b) shows a prediction search window example including an intersection.

When a start point and a destination are set in a car navigation system, a search route is displayed, and a user decides the actual travel route. During traveling on the travel route, the state prediction device 10 sets the prediction search windows as the occasion demands, and searches movement of the object that exists within the prediction search window. The object identification unit 14b may elongate the length of the prediction search window as the travel speed of the own vehicle becomes faster (refer to FIG. 4 (a)).

The prediction search window shown in FIG. 4 (b) includes an intersection of a single-lane road on either side. In the present example, since the width of one traffic lane is approximately 4 m, it is possible to set imaginal two lanes for one traffic lane, and to reduce the finite state series described below according to whether a forward vehicle that is an observation object exists in either lane namely either a rightmost lane or a center lane for example.

By forming the prediction search windows along the travel route thus as the occasion demands, the object movement prediction can be executed unceasingly during travel. Further, not limited to a car navigation system, it may configured that the object identification unit 14b acquires the vehicle speed information of the own vehicle from the vehicle speed sensor 36 through the ECU 32 during travel, determines the length of the search window based on it to decide the prediction search window, executes a periphery monitoring process independently from the car navigation system during travel, executes determination of the collision risk, and outputs an alarm. Also, the order of steps S100 and S101 may be reversed.

The object identification unit 14b detects and identifies the feature of an automobile, human being, two-wheeled vehicle and the like from the first image by a known method for identification (S102). The object identification unit 14b stores the identified result in the RAM 18 as the identified data of the identified object. Detection of the feature of the object is executed by calculation of the HOG feature quantity from the photographed image by the CPU 14 for example, and identification of the object is achieved by that the CPU 14 executes the calculation process of a support vector machine, boosting, and the like stored previously in the ROM 16 with respect to the degree of similarity with the feature quantity calculated from the identification dictionary that is stored previously in the ROM 16 or the file unit 20. At this time, an identifier corresponding to the identified object and the identified data may be attached.

By the present process, the kind of the photographic subject of the first image is identified, and the vehicle, the pedestrian, and the signal are discriminated.

Further, the object identification unit 14b identifies a photographic subject that executes movement prediction out of plural photographic subjects as an observation object, and selects a purpose attribute and a target parameter of the observation object (S103). For example, from the photographic subject of the first image, the vehicle is decided as the observation object. When the observed object is a vehicle, the relative position of the vehicles of an own vehicle and the observation object is recognized based on the image of the camera 24, whether the vehicle is a forward vehicle, a vehicle on the adjacent lane, or an oncoming vehicle is identified. For example, when the rear part of a vehicle is photographed at the center of the image of the camera 24, the vehicle is recognized to be a forward vehicle, whereas when the rear part of a vehicle is photographed at a position deviated to either left or right of the image, the vehicle is recognized to be that of the adjacent lane. Also, when the front face of a vehicle is photographed, the vehicle is recognized to be an oncoming vehicle.

The object identification unit 14b selects a purpose attribute and a target parameter of the object (S104), and further selects a purpose attribute and a target parameter of the environmental factor that restricts the movement of the object (S105). Although the present embodiment will be explained with a vehicle being made an object and citing the road/lane as an example of the environmental factor that restricts the movement of the vehicle, the environmental factor for predicting the movement of the vehicle is not limited to the road/lane in fact, and it is also possible that information of all photographic subjects photographed within the first image, for example the signal, oncoming vehicle, bicycle, pedestrian, each road/lane connected to the intersection, is selected as the environmental factor, and a purpose attribute and a target parameter of each environmental factor are selected and are inputted to a calculation engine for movement observation for example a neural network. Further, it is also possible that, as the environmental factor, real time information such as the congestion information and the road regulation information from the VICS (vehicle information and communication system) is inputted to a calculation engine for movement observation as the environmental factor.

When the object is a forward vehicle, the object identification unit 14b selects a purpose attribute and a target parameter of the road/lane as an environmental factor. Also, in order to read a purpose attribute of the road/lane through which the forward vehicle travels, the object identification unit 14b identifies a lane through which the own vehicle travels from the position calculation device 26. When the object is a forward vehicle, by identifying the speed/acceleration of the forward vehicle and to which lane of the straight traveling, the left turn, and the right turn the travel lane of the own vehicle belongs, the travel lane of the forward vehicle can be identified.

The object identification unit 14b reads a purpose attribute of the road/lane on the travel lane of the forward vehicle from the purpose attribute dictionary 211. Here, the purpose attribute expresses a use purpose of the observation object, and the target parameter is a data structure set for achieving the purpose. Data that specify the purpose attribute of each observation object and environmental factor are stored in the purpose attribute dictionary 211, and the target parameter corresponding to the purpose attribute of each environmental factor is stored in the target parameter information storage unit 212. Hereinafter, as the data examples stored in the purpose attribute dictionary 211 and the target parameter information storage unit 212, respective model examples of the vehicle and the road/lane will be explained. The purpose attribute and the target parameter are included in each model.

(The Case of a Vehicle)
Purpose attribute: {traveling, moving, parking, stopping vehicle (stopping), getting in/out, transporting, conveying, towing, oil filling, charging, discharging}
Target parameter: {start point (time), destination (time), route, stopover point (time), parking point (time)}
(The Case of a Road/Lane)
Purpose attribute: road name with order, {straight traveling, left turn, right turn, joining, branching, U-turn}
Target parameter: {topology name, purpose, target, connection angle, lane number, length, width, curvature, gradient, and the like}

Figure 5:
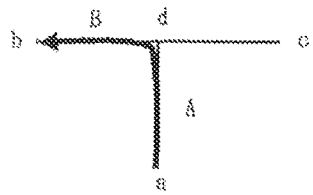
FIG. 5 is a drawing that shows an example of a purpose attribute and a target parameter when a topology name is a T-shaped intersection.

FIG. 5 shows an example of the purpose attribute and the target parameter when the topology name is a T-shaped intersection.

The object identification unit 14b outputs the purpose attribute and the target parameter that are read on an object to the state prediction unit 14c.

Based on an output from the periphery monitoring sensor 24, the state prediction unit 14c executes movement observation of the identified object, and obtains a movement series (equivalent to a finite state series) and calculates acceleration (S106). When the periphery monitoring sensor 24 is a camera, movement observation is executed by comparison of the first image and the second image (equivalent to the second sensor information) that is photographed thereafter, however, when a millimeter-wave radar or a LIDAR is used, since the relative speed of the object with respect to the own vehicle can be obtained (the acceleration also can be obtained by differential calculation), based on it and the own vehicle speed outputted by the speed sensor of the own vehicle, the movement series and the acceleration of the object are obtained. When this step is processed first, the object is observed after a constant time from the time point when the object is identified first to obtain the speed of the object, and the object is observed still after a constant time to obtain the acceleration of the object.

Also, the state prediction unit 14c retrieves the state series dictionary 202 stored in the file unit 20 based on the result of the movement observation of the object, and selects plural finite state series formed of an assembly of movement vectors of the identified object (S107).

The state prediction unit 14c reduces the movement series from the retrieved finite state series based on the purpose attribute and the target parameter of step S105 (S108). FIG. 6 shows a movement series example, in which (a) is a drawing that schematically shows a selection example of a movement series when the road/lane are made not have a purpose attribute, and (b) is a drawing that schematically shows an example in which the road/lane are made have a purpose attribute and the movement series are reduced.

When the road/lane are made not have a purpose attribute, since the movement series come to be selected mainly by the position on the road, the speed, and the acceleration, if the speed and the acceleration are small in the vicinity of an intersection, the selection range of the movement series cannot be reduced but is widened (refer to FIG. 6 (a)). Meanwhile, when the road/lane has a purpose attribute, even when the speed and the acceleration are small, the selection range of the movement series can be reduced. For example, in FIG. 6 (b), by the purpose attribute of the road/lane, with respect to a forward vehicle that is during travel on a straight traveling lane or a left turn lane, the movement series directed to the right direction among the movement series is not selected, only the movement series of the straight traveling or the movement series directed to the left direction is selected, and therefore the selection range of the movement series can be reduced compared to the movement series of all directions. In a similar manner, with respect to a forward vehicle that is during travel on a right turn lane, since only the movement series directed to the right direction is selected among the movement series, the selection range of the movement series can be reduced compared to the movement series of all directions.

The state prediction unit 14c applies plural series having been selected to the object (S109). As shown in FIG. 6, to superimpose the reduced movement series on the object is equivalent to the application process of the present step.

The state prediction unit 14c superimposes the movement series and the acceleration observed in S106 on an object whose movement has been predicted (S110). The state prediction unit 14c may acquire an observation value that is obtained by observing the observation object based on the first image, or may acquire the result of observation of the observation object using another kind of the periphery monitoring sensor, for example the relative speed of the forward vehicle by a millimeter-wave radar and the own vehicle speed from the vehicle speed sensor 36, calculate acceleration of the forward vehicle using both, and calculate an observation value. Also, using this observation value, the reduced finite state series are corrected.

Figure 7:
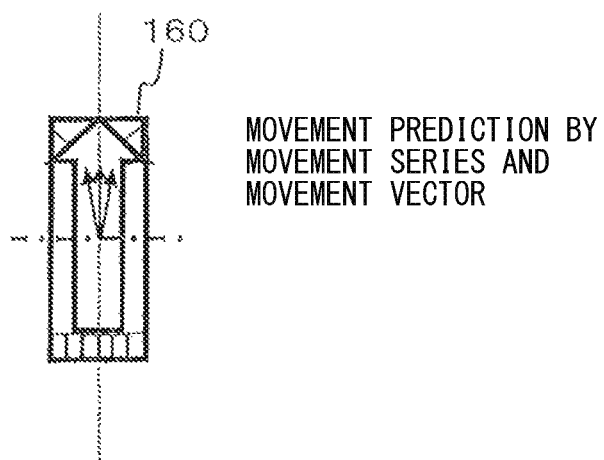
FIG. 7 is a drawing that shows a movement prediction by a movement series and a movement vector.
Figure 8:
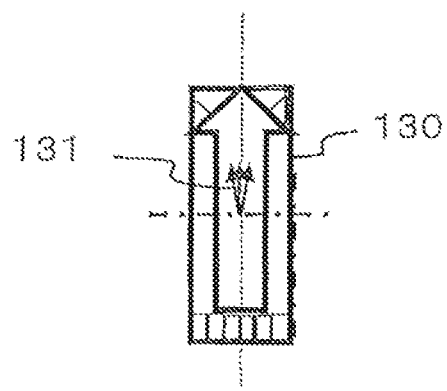
FIG. 8 is a drawing that shows a state in which a movement series having been selected is allocated to an observation object.
Figure 9:
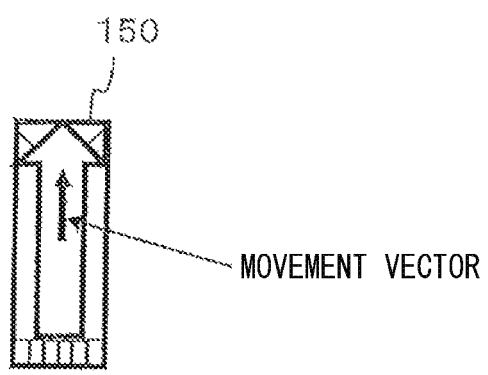
FIG. 9 is a drawing that shows a movement vector of an observation object.

Hereinafter, the process of the present step will be explained referring to FIG. 7 to FIG. 9. FIG. 7 is a drawing that shows a movement prediction by the movement series and the movement vector. FIG. 8 shows a state in which a movement series 131 having been selected is allocated to the observation object. FIG. 9 is a drawing that shows a movement vector of the observation object. A movement prediction 160 of FIG. 7 shows a state in which a movement vector (refer to FIG. 9) is superimposed on a state in which the movement series 131 having been selected is allocated to an observation object 130 of FIG. 8. With respect to the movement prediction 160 (refer to FIG. 7), by a movement series 150 having been superimposed, the size becomes different from that of the movement series 131 before superimposing (FIG. 8). In the present example, the length of the vector of the movement series in the movement prediction 160 of FIG. 7 becomes longer compared to the movement series 131 of FIG. 8.

Figure 10A:
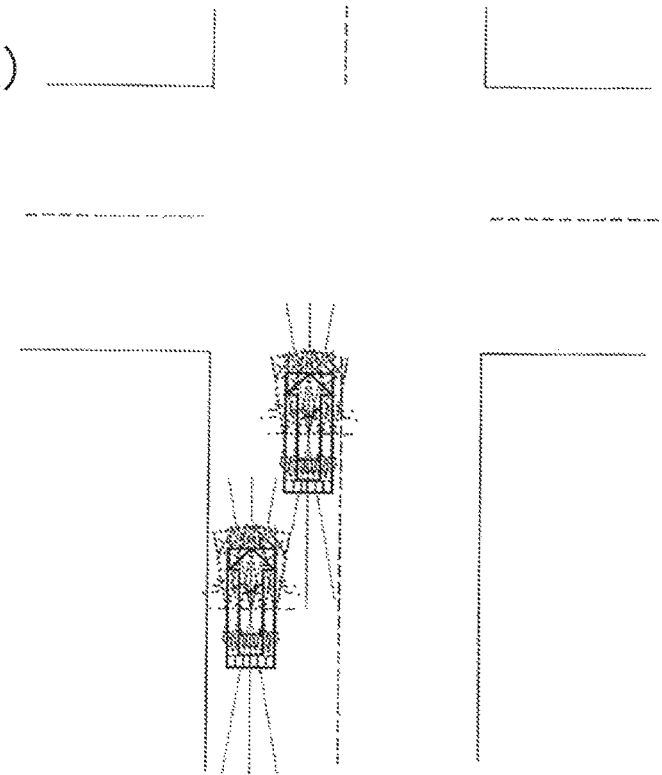
FIG. 10 is a drawing that shows a state prediction example, in which (a) shows an example in which road/lane are made not have a purpose attribute, and (b) shows an example in which the road/lane are made have a purpose attribute.
Figure 10B:
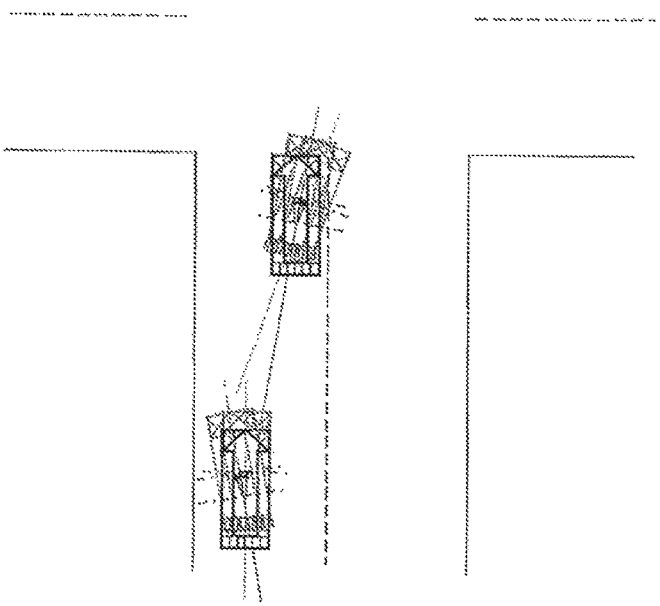

An example in which this process is applied to a movement prediction on a two-dimensional road map is shown in FIG. 10. FIG. 10 (a) shows an example in which the road/lane are made not have a purpose attribute, and FIG. 10 (b) shows an example in which the road/lane are made have a purpose attribute. By making the road/lane have a purpose attribute, the movement prediction in which the selection number of the plural movement series having been retrieved is reduced becomes possible. Therefore, accuracy of the movement prediction can be improved.

Figure 11:
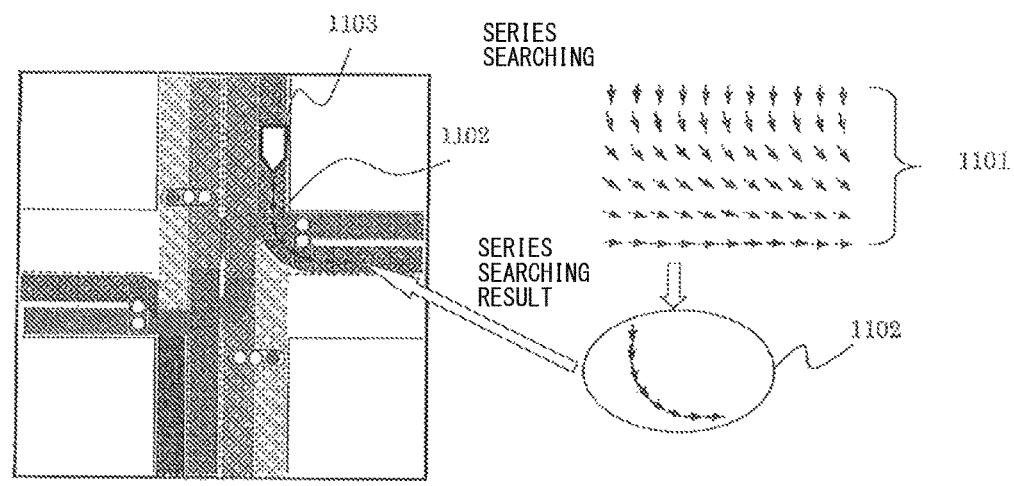
FIG. 11 is a drawing that shows a result obtained when a state prediction is executed continuously.

The state prediction unit 14c outputs a state prediction (equivalent to the movement prediction in the first embodiment) (S111). FIG. 11 is a drawing that shows a result obtained when the state prediction is executed continuously. When series searching of the movement series of a vehicle 1103 that is an observation object is executed, plural movement series are obtained as shown in the reference sign 1101. When reduction is executed from this and remaining movement series are connected one by one, a flow of one movement series is formed as shown in the reference sign 1102. A prediction search window is displayed on a monitor 38, the movement series shown by the reference sign 1102 is added to the vehicle 1103 within the prediction search window and is displayed, and thereby an event that the vehicle 1103 would make left turn can be provided to a driver as state prediction information.

Also, as an aspect of the output of the movement prediction, the state prediction unit 14c may output the result of the movement prediction to the matching unit 14d.

The matching unit 14d may execute verification of the movement prediction by comparing the movement prediction executed in the first image with the photographic subject region where the object is photographed in the second image. By feedback of the result to the process of the object identification unit 14b with respect to a third image one by one, the accuracy of the movement prediction can be improved, and the movement prediction can be corrected. Also, when it is determined to have a risk of collision to a forward vehicle or a pedestrian based on the result of execution of the matching process, such risk may be outputted to a HUD or an alarm device mounted on the vehicle to call an attention, or control information for operating the brake device 34 may be outputted to the ECU 32.

Also, the state prediction unit 14c may output the movement prediction on the monitor 38 to display the movement prediction of the object on the screen of the monitor. For example, an image of an immediately forward vehicle may be displayed on the monitor, and an arrow that shows the movement prediction may be displayed so as to be superimposed on the image of the immediately forward vehicle of the monitor.

According to the present embodiment, by previously preparing a purpose attribute and a target parameter of the environmental factor which restrict movement of the object when the movement prediction of the object is to be executed, the candidates of the movement prediction of the object can be reduced. Thus, accuracy of the movement prediction can be improved.

Second Embodiment

The second embodiment is an embodiment in which a crop that is a fixed point observation object of a state prediction is subjected to fixed point photograph using a fixed point camera as a periphery monitoring sensor, and growth observation of the crop is executed, the growth observation of the crop being a growth prediction and abnormality monitoring of the crop and a state prediction and abnormality monitoring of a crop growth environment for example. In the present embodiment, a finite state series that specifies a series of the shape change accompanying the growth of a crop is applied, and a model is prepared which is obtained by modeling the shape of the crop of an initial state. Further, it is also possible that a shape change amount of the crop is calculated from an image of the time of the state prediction, and the model is subjected to geometric transformation based on the finite state series according to the change amount to calculate the prediction state. Furthermore, from the deviation of the prediction and the observation, detection of abnormality can be noticed and the cause of the abnormality can be estimated.

At this time, it is possible to prepare a dictionary that makes the purpose attribute and the target parameter correspond to a crop and a crop growth environment, and to use the dictionary for searching the state series. As examples of the purpose of a crop itself, sprouting, growth, flower setting, blossoming, fruition, withering, and the like can be cited. Also, as examples of the target parameter, the height of stems, the size of leaves, the number of leaves, the color of leaves, the space between leaves, the number of flowers, the size and shape of fruits, and the like can be cited. By using the purpose attribute and the target parameter for searching the state series, searching of the state series that predicts blossoming and a fruition state becomes possible from the time point when a bud and a fruit are not observed yet for example. Also, as examples of the growth environment, a heater and a thermometer for observing the temperature for keeping the growth temperature of a crop appropriate, a waterer for feeding water to a crop, lighting for giving light to a crop, and the like can be cited. When the growth schedule of a crop and the control information of the temperature of the growth environment, water supply, and lighting have been given as the growth plan of a crop from the outside as the purpose attribute and the target parameter, the purpose attribute and the target parameter are also used for searching the state series to execute a growth prediction of a crop. When the deviation between the observation value and the prediction values of the temperature sensor of the heater, the watering sensor of the waterer, and the illumination intensity sensor of the lighting has been detected, state series of the crop and the growth environment are reversely searched so as to match the observation value. The results of the reverse searching may be outputted as excess and deficiency information of the temperature, watering, lighting, and the like and the feedback information for the control, may be outputted as abnormality detection of respective sensors of the temperature, watering, and lighting, and may be outputted as possibility information of the disease and insect damage.

According to the second embodiment, since a state prediction of a crop is executed, growth environment of the crop is improved, and effects of increasing the yield amount and allowing adjustment of the harvest timing can be expected.

The embodiments described above are not intended to limit the present invention, and various changed aspects within a range not deviating from the gist of the present invention are to be included in the present invention.

For example, in the first embodiment, a state prediction device was mounted on a vehicle and a state prediction of an object in the periphery of the vehicle such as a forward vehicle, a vehicle of an adjacent lane, an oncoming vehicle, a pedestrian, a bicycle for example was executed, and therefore the object was a moving object. However, the object is not limited to a moving object, and may be a stationary object. For example, it is also possible to apply a state prediction device according to the present invention to the night-time security of the inside of a building, to make the objects corridors, doors, entrances and exits, to apply a model that continuously maintains a stationary state (vector is 0) as a model of a state prediction, and to use a microphone that collects a sound signal as a periphery monitoring sensor. In this case, although a silent state continues when the stationary objects continue to stand still within a building at night, it may be configured that, when there is an intruder for example, a sound signal is picked up and abnormality is detected.

Further, it is also possible that, in the second embodiment, the object of the state prediction using a fixed point camera is made a space of an entrance and an exit of a building, a threshold, and so on, and the movement prediction (state prediction) of an object, for example a suspicious person, photographed in an image of the fixed point camera is executed.

Further, although the state prediction unit $14c$ reduced the finite state series using a purpose attribute and a target parameter of each of an observation object and an environmental factor according to the embodiment described above, the finite state series may be reduced using only the purpose attribute. In this case, in an example of executing a state prediction of a forward vehicle for example, when the purpose attribute of the traveling lane of the forward vehicle is the right-turn lane, it may be also configured that only the finite state series that show the state transition of the right direction are reduced.

REFERENCE SIGNS LIST

10 . . . State prediction device
14 . . . CPU
16 . . . ROM
18 . . . RAM
20 . . . File unit
22 . . . External I/F
24 . . . Periphery monitoring sensor

The invention claimed is:

1. A state prediction device, comprising:
a sensor information acquisition unit that acquires first sensor information that is obtained with observation of a state of an observation object at a first time by a periphery monitoring sensor;
a purpose attribute storage unit that stores a purpose attribute that shows a use purpose or an observation purpose of the observation object and a purpose attribute that shows a use purpose or an observation purpose of an environmental factor that affects the state change of the observation object;
an object identification unit that identifies the kind of the observation object based on the first sensor information, reads a purpose attribute corresponding to an identified kind of the observation object from the purpose attribute storage unit, identifies the kind of the environmental factor based on the first sensor information, and reads a purpose attribute corresponding to an identified kind of the environmental factor from the purpose attribute storage unit;
a finite state series storage unit that stores a finite state series that corresponds to the kind of the observation object and specifies a series of a plurality of state changes accompanying the time course; and
a state prediction unit that retrieves and selects plural finite state series corresponding to the kind of the observation object from the finite state series storage unit, reduces the selection number of the plural finite state series to be retrieved, based on the purpose attribute of the observation object and the purpose attribute of the environmental factor, acquires an observation value obtained by observation of the observation object, corrects the reduced finite state series based on the observation value, and outputs the corrected finite state series as a state prediction.

2. The state prediction device according to claim 1, further comprising:
a target parameter information storage unit that stores target parameter information set to achieve the purpose attribute of the observation object and each purpose specified in the purpose attribute of the observation object,
wherein the object identification unit reads target parameter information corresponding to the purpose attribute of the observation object from the target parameter information storage unit and reads target parameter information corresponding to the purpose attribute of the environmental factor from the target parameter information storage unit, and
the state prediction unit reduces the selection number of the plural finite state series to be retrieved using further target parameter information corresponding to the purpose attribute of the observation object and target parameter information corresponding to the purpose attribute of the environmental factor.

3. The state prediction device according to claim 1,
wherein the sensor information acquisition unit acquires second sensor information that is obtained by observation of the observation object by the periphery monitoring sensor at a second time that is later than the first time, and
the state prediction device further comprises a matching unit that executes a matching process between a state prediction outputted by the state prediction unit and a state of the observation object included in the second sensor information.

4. The state prediction device according to claim 1,
wherein the observation object is a vehicle, and
the periphery monitoring sensor is a camera mounted on the vehicle.

5. The state prediction device according to claim 1,
wherein the observation object is a fixed point observation object, and
the periphery monitoring sensor is a fixed point camera that photographs the fixed point observation object.

6. A state prediction method, comprising:
a step for acquiring a first sensor information that is obtained with observation of a state of an observation object at a first time by a periphery monitoring sensor;
a step for identifying a kind of the observation object based on the first sensor information, reading a purpose attribute a purpose attribute corresponding to an identified kind of the observation object from a purpose attribute storage unit that stores a purpose attribute that shows a use purpose or an observation purpose of the observation object and a purpose attribute that shows a use purpose or an observation purpose of an environmental factor that affects the state change of the observation object, identifying the kind of the environmental factor based on the first sensor information, and reading a purpose attribute corresponding to an identified kind of the environmental factor from the purpose attribute storage unit; and
a step for retrieving and selecting plural finite state series corresponding to the kind of the observation object from a finite state series storage unit that stores a finite state series that corresponds to the kind of the observation object and specifies a series of a plurality of state changes accompanying the time course, reducing the selection number of the plural finite state series to be retrieved, based on the purpose attribute of the observation object and the purpose attribute of the environmental factor, acquiring an observation value obtained by observation of the observation object, correcting the reduced finite state series based on the observation value, and outputting the reduced finite state series as a state prediction.

* * * * *